United States Patent [19]

Deisch

[11] 3,781,483

[45] Dec. 25, 1973

[54] LINE FEED AND ISOLATION TRANSFORMER WITH INTEGRAL LOOP SUPERVISION

[75] Inventor: Cecil Winston Deisch, Wheaton, Ill.

[73] Assignee: Bell Telephone Laboratories, Incorporated, Murray Hill, N.J.

[22] Filed: Dec. 2, 1971

[21] Appl. No.: 204,001

[52] U.S. Cl. ............ 179/18 F, 317/156 TR, 179/70

[51] Int. Cl. ............ H04m 3/22

[58] Field of Search ............ 179/18 FA, 18 F, 179/70; 335/151; 317/156 TR, 156 R

[56] References Cited

UNITED STATES PATENTS

| | | | |
|---|---|---|---|
| 3,175,042 | 3/1965 | Baldwin, Jr. et al. | 179/18 FA |
| 3,492,613 | 1/1970 | Van Husen | 335/151 |
| 2,653,280 | 9/1953 | Kiltie | 317/165 |

*Primary Examiner*—William C. Cooper
*Attorney*—W. L. Keefauver et al.

[57] ABSTRACT

Apparatus is disclosed for providing all of the functions of battery-feed, isolation, and supervision for a line circuit in a communication switching system. The apparatus comprises a primary and a secondary winding coupled inductively via a magnetic core which includes an air gap. A reed contact pair is positioned across the air gap to operate and give indication of the presence of magnetic flux across the air gap resulting from current flow in the primary winding.

4 Claims, 2 Drawing Figures

LINE FEED AND ISOLATION TRANSFORMER WITH INTEGRAL LOOP SUPERVISION

This invention relates to communication switching systems, and, more particularly, to a line circuit for such a system in which battery-feed, isolation, and supervision of each line of the system is provided by a single, integrated apparatus.

BACKGROUND OF THE INVENTION

In a communication line circuit, provision must be made for the separate functions of battery-feed, isolation, and supervision. Battery-feed supplies the power for the station set without unduly distorting or attenuating the normal signals. Isolation of the switching network from the outside influences of unwanted voltages is usually provided by a transformer which inductively couples the normal signals passing between the switching network and the communication line. Supervision is normally obtained by detecting the condition of the station set which is using the line circuit.

Conventionally, battery-feed current is passed through the isolation transformer and then through a separate supervisory device, such as a relay or ferrod. The inductance of the transformer isolates the low impedance of the supervisory device from the line, thus preventing attenuation of normal alternating signals on the line. At the same time, the supervisory device detects direct current flow in the line for supervisory purposes. The supervisory device, commonly a relay, is usually wound with two electrically isolated and magnetically balanced windings. This configuration makes the device insensitive to longtiudinal currents which might otherwise give false supervisory indications.

The isolation transformer is also wound with two electrically isolated and magnetically balanced windings to prevent longitudinal voltages appearing on the line from being converted into unwanted noise which could be transmitted through to the switching network.

In the interest of economy, and in a continuing desire to miniaturize and simplify communication systems, the prospect of combining all of the above functions into a single device becomes increasingly attractive.

SUMMARY OF THE INVENTION

It is therefore an object of my invention to provide a single device to isolate a communication line from a switching network, to supply battery-feed for the line, and to furnish origination, signaling, and answer supervision.

In an illustrative embodiment of my invention, a hollow bobbin is wound with a split primary winding and a secondary winding. A ferromagnetic core is provided which encircles the windings and which includes a center leg positioned through the hollow portion of the bobbin. This center leg is provided with an air gap to prevent magnetic saturation of the core when direct current flows through the windings. A glass-enclosed magnetic reed switch is also positioned in the hollow of the bobbin so that the air gap of the center leg of the ferromagnetic core is located adjacent to the center of the reed bottle.

Two ends of the primary winding connect to the communication line and the two ends of the secondary winding connect to the switching network. Closure of the loop to the communication line will cause a direct current to flow in the primary winding. Most of the magnetomotive force generated in the core by the current in the primary winding will appear across the air gap in the center leg. This magnetomotive force is coupled onto the magnetic reeds, causing them to close and make contact. As a result, the state of the communication line may be supervised by monitoring the condition of the reed switch.

DESCRIPTION OF THE ILLUSTRATIVE EMBODIMENT

Figure 1:
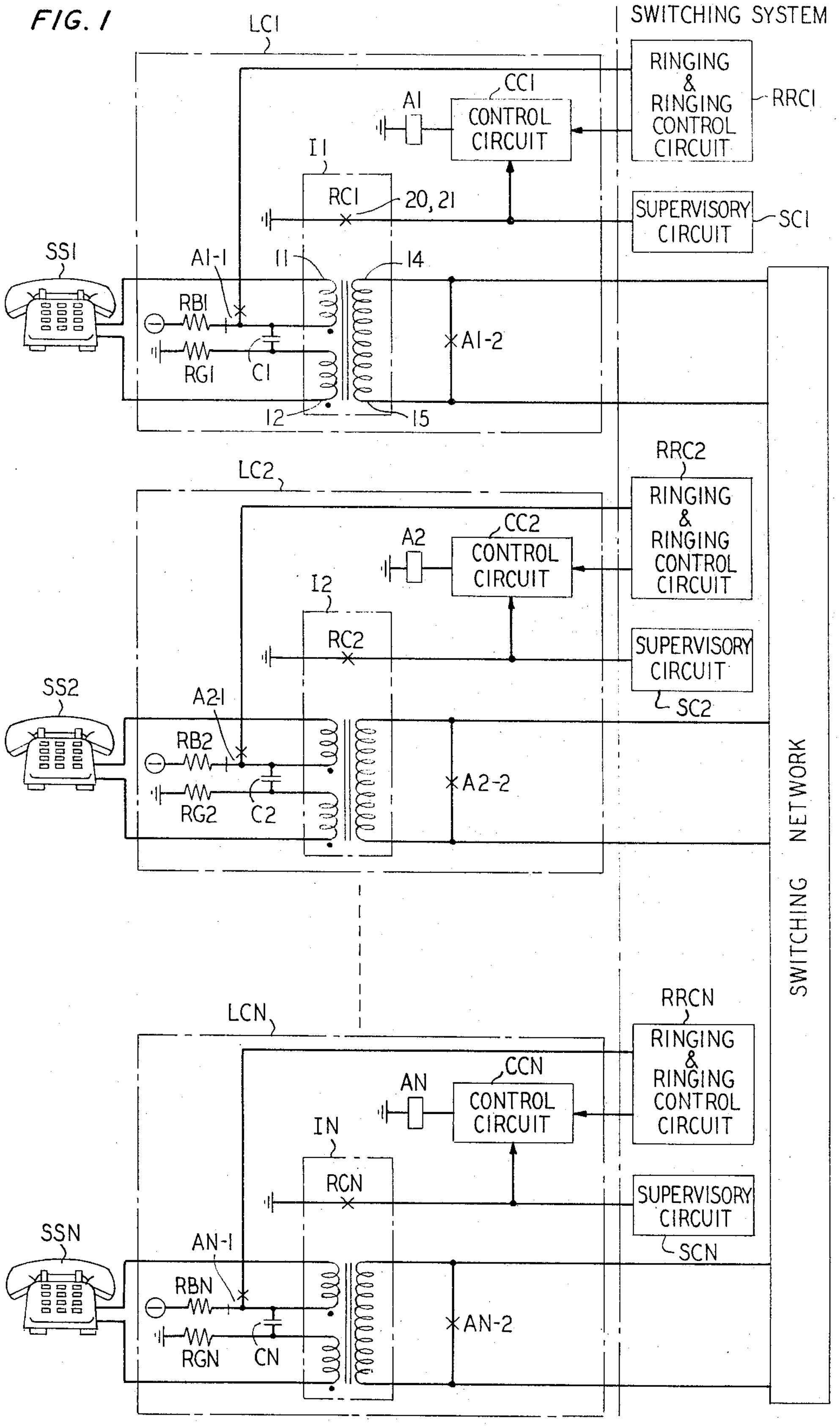
FIG. 1 is a schematic view of a communication system embodying my invention.

FIG. 1 shows a communication system serving a plurality of subscribers via associated communication lines. Between each communication line and the switching network is a line circuit. Shown as part of line circuits LC1 through LCN, and designated I1 through IN, is a schematic representation of my invention, hereafter referred to as an inductoreed.

Figure 2:
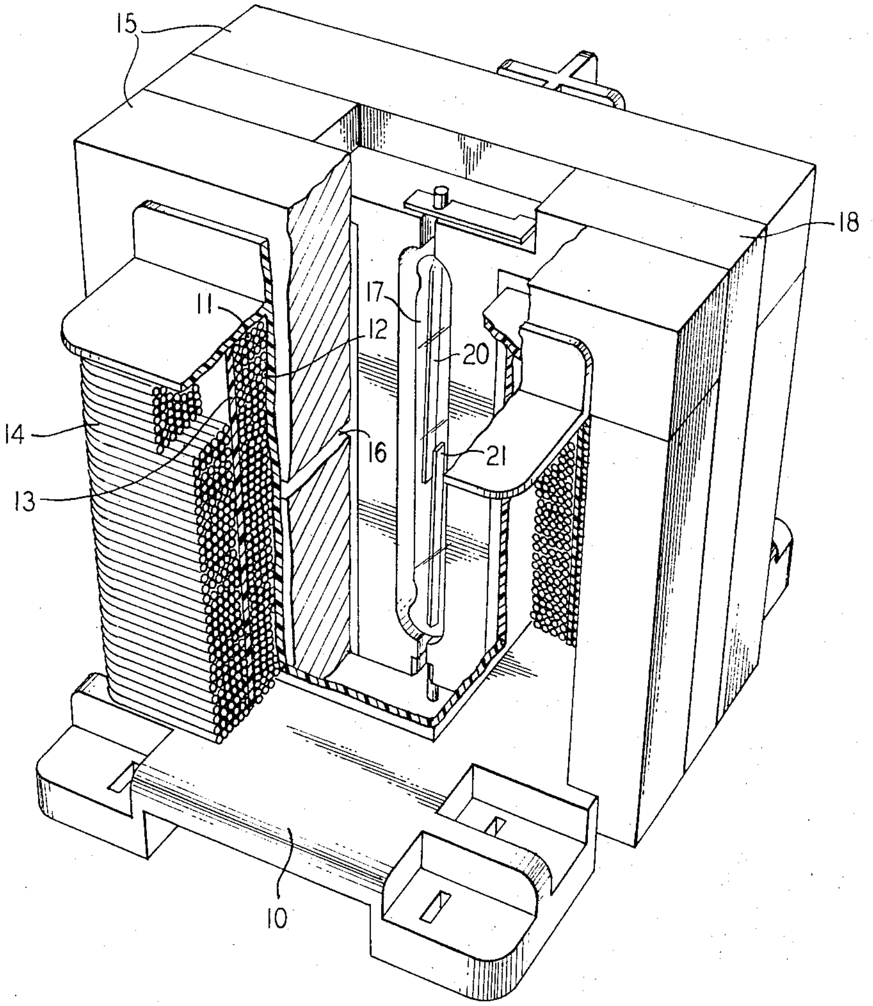
FIG. 2 is a perspective view of the apparatus of my invention.

The apparatus of an inductoreed is shown in a sectional perspective in FIG. 2. A hollow bobbin 10 is wound with a split primary winding 11 and 12. The primary winding is covered with a layer of insulation 13, following which secondary winding 14 is wound onto the form. As the sectional view shows, bobbin 10 has a base portion and a hollow column around which the windings are formed. A support piece 18 is adapted to fit around the wound bobbin and position a reed bottle 17 in the hollow of the column portion of bobbin 10. On either side of support 18 is a ferromagnetic core member 15. Core 15 is formed to surround the wound bobbin, with a portion appearing in the hollow of the column portion of bobbin 10.

The portion of core 15 which appears inside the hollow of bobbin 10 has an air gap 16 which coincides approximately with the midpoint of reed bottle 17. The two reed contacts 20 and 21 of reed bottle 17 are spaced apart in their normal position. When current flows through primary winding 11 and 12, a magnetic flux appears in core 15. The magnetomotive force appearing across air gap 16 is sufficient to cause reeds 20 and 21 to be attracted to each other, closing the contact.

To illustrate the complete applicability of the apparatus shown in FIG. 2, let me describe its operation in a typical telephone system using the basic line circuit shown in FIG. 1. Line circuit LC1, associated with subscriber portion 1, is typical. All of the battery-feed current for the subscriber line flows through primary windings 11 and 12 and through the current limiting resistors RB1 and RG1 to battery and ground, respectively. If this were a conventional line circuit, RB1 and RG1 would be replaced by the supervisory relay, whose winding resistance would be sufficient to limit the current in the subscriber loop.

Capacitor C1 provides a short for normal alternating signals to prevent the current limiting resistors RB1 and RG1 from introducing unnecessary signal loss. Transfer contacts A1-1 and A1-2 are operated from a separate alerting (ringing) relay A1. Relay A1 is controlled by control circuit CC1 which has inputs from a reed contact pair RC1 and the switching system. As will be explained below, reed contact pair RC1 operates in response to current in the subscriber line. If subscriber line 1 is originating a call, a path is closed through the station set SS1 which allows loop current to flow through the primary windings 11 and 12 of inductoreed I1. This current causes reed contact pair RC1 (designated 20, 21) to operate. This condition is sensed by supervisory circuit SC1 in the switching center.

The switching system then takes action and signals subscriber line 1 that it is ready to accept signaling from station set SS1. If station set SS1 generates tone signals, these are passed through inductoreed I1 and into the switching center in the same manner as normal communication signals. If station set SS1 signals by opening and closing the subscriber line loop (dial pulses), the changes in loop current will be sensed by reed contact pair RC1 due to the change in magnetomotive force across the air gap in core 15.

This information is passed through reed contact pair RC1 to supervisory circuit SC1. Since the reed contact pair is fast operating compared to a conventional relay, it easily follows loop supervisory signals such as would be generated by a rotary dial. After the system switching center has received all of the signaled information, it establishes a communication path through the network to the line circuit of the subscriber line being called.

If a line is to receive a call (for example, subscriber line 2), the switching center first tests the condition of the line by monitoring the state of contact pair RC2. If the line is idle, the ringing control circuit RRC2 in the switching center sends a signal to control circuit CC2 in line circuit LC2, causing ringing relay A2 to operate. Transfer contact A2-1 operates to interrupt battery through resistor RB2 and connect the ringing signal source in RRC2 to the subscriber line 2 through the primary winding of inductoreed I2. The ringing signal comprises an alternating signal superimposed on a direct voltage. The alternating signal operates the call alerting device (the ringer) and the direct voltage temporarily provides battery-feed. Contact A2-2 closes to place a short circuit across the secondary winding of inductoreed I2 to prevent the alternating component of the ringing signal from passing into the switching network.

Although subscriber line 2 draws no direct current while the ringing signal is applied, station set SS2 does allow the alternating signal to pass through the loop. Since reed contact pair RC2 could easily follow the conventional 20 Hz ringing signal, the alternating component would cause reed contact pair RC2 to operate and release on each alternation if the short provided by contact A2-2 were not present. The shorted secondary winding prevents the alternating signal current from generating sufficient magnetomotive force across the air gap of the core to operate reed contact pair RC2.

When the called line answers, station set SS2 allows direct loop current to flow from the battery-feed provided by the direct voltage component of the ringing signal. Since the shortened secondary winding has no effect on the steady state magnetomotive force appearing across the air gap, reed contact pair RC2 will operate. This will be sensed by supervisory circuit SC2 which will cause the ringing signal to be removed by releasing relay A2. This will restore normal battery-feed through the break portion of transfer contact A2-1 and resistor RB2. After relay A2 releases, reed contact pair RC2 remains operated due to the continued appearance of loop current flowing through station set SS2.

Throughout the duration of the call, inductoreeds I1 and I2 supervise the two communication lines in the connection. Should either set terminate the call by interrupting the loop current, the associated inductoreed will release its reed contact pair. This change will be detected by the supervisory circuit. The switching center will then remove the connection through the switching network.

It should be apparent to one skilled in the communications art that the primary winding need not be split. So long as current flows through a primary winding and induces a magnetomotive force in the core, the inductoreed will function as described.

It should also be apparent that the inductoreed's applicability is not restricted to a voice path telephone system. It has applicability in any type of communication system, whether voice or data. The inductoreed is also applicable in inter-office calls, as well as intraoffice calls and may be used as effectively to supervise a trunk circuit as it is to supervise a subscriber line. The inductoreed is not restricted to any particular type of termination, but can supervise any communication system terminal so long as current is conducted by a winding of the inductoreed when the conductor pairs of the termination are closed.

It would be impractical to discuss all the possible signalling combinations which could appear on the termination pair. A summary of the signaling appearing just in telephone switching systems is described in "Signaling Systems for Control of Telephone Switching," Bell System Technical Journal, Vol. XXXIX, No. 6, November, 1960, by C. Breen and C. A. Dahlbom. Other communication systems could include a variety of other signals. However, it would be clear to one skilled in the communications art how the inductoreed described herein could be applied to supervise the signal termination while providing necessary isolation.

What is claimed is:

1. In a communication line circuit comprising a transformer having a first winding connected to a communication line, a second winding connected to a switching center and a magnetic core inductively coupling the first and second windings, said core including an air gap within said windings, the improvement which comprises a switch operable by the magnetomotive force across said air gap to give supervisory signal indications of the status of the communication line.

2. A communication line circuit having a first winding connected to an associated communication line;

a communication system switching center termination having a second winding connected thereto;

a magnetic core encircled by said windings for inductively coupling the communication line to the switching center termination through the first and second windings, the core including an air gap within said windings; and a reed switch positioned across the air gap and operable in response to magnetomotive force appearing across the air gap to give a signal indication of the appearance of supervisory signals on the communication line.

3. A communication line circuit comprising a first winding connectable to the associated line;

a second winding connectable to a switching center;

a magnetic core, having an air gap therein, for inductively coupling the first and second windings;

a pair of contacts operable in response to the appearance of magnetomotive force across the air gap; and a hollow bobbin around which the first and second windings are wound; and wherein;

the inductive coupling of the first and second windings is effective to permit signaling between a connected line and a connected switching center; and the operation of the pair of contacts is effective to give supervisory signal indications of the status of the connected line;

the magnetic core is adapted to encircle the wound bobbin and includes a leg, having the air gap therein, positioned inside the hollow of the bobbin; and the pair of contacts are located across the air gap in the leg of the magnetic core and inside the hollow of the bobbin.

4. A communication system comprising a switching center including a switching network;

a plurality of communication lines;

a plurality of communication line circuits for connecting the communication lines to the switching center;

means for interconnecting one of the communication lines with another selected one of the communication lines through the switching network; and isolation and supervision means associated with each of the lines and including a transformer comprising a first winding connected to the associated line, a second winding connected to the switching center, and a magnetic core encircled by said windings and having an air gap within said windings for inductively coupling the first and second windings to permit the transmission of signals between the line and the switching center; and a pair of reed contacts positioned across the air gap and responsive to the appearance of magnetomotive force across the air gap for producing supervisory signals indicative thereof.

* * * * *